US010724808B2

(12) United States Patent
Alhassan et al.

(10) Patent No.: US 10,724,808 B2
(45) Date of Patent: Jul. 28, 2020

(54) PLUGGING A HEAT EXCHANGER TUBE

(71) Applicant: Saudi Arabian Oil Company, Dhahran (SA)

(72) Inventors: Ridha A. Alhassan, Al-Ahsa (SA); Shadi M. Hazmi, Al-Ahsa (SA); Abdullah M. Al-Otaibi, Khobar (SA); Jalal M. Ramdhan, Al-Ahsa (SA)

(73) Assignee: SAUDI ARABIAN OIL COMPANY (SA)

( * ) Notice: Subject to any disclaimer, the term of this patent is extended or adjusted under 35 U.S.C. 154(b) by 47 days.

(21) Appl. No.: 16/059,232

(22) Filed: Aug. 9, 2018

(65) Prior Publication Data

US 2020/0049431 A1 Feb. 13, 2020

(51) Int. Cl.
*F16L 55/12* (2006.01)
*F28F 11/02* (2006.01)
*F28D 7/16* (2006.01)
*F16L 55/132* (2006.01)

(52) U.S. Cl.
CPC ............ *F28F 11/02* (2013.01); *F16L 55/132* (2013.01); *F28D 7/1607* (2013.01)

(58) Field of Classification Search
CPC ...... F28F 11/02; F16L 55/132; F16L 55/1283; F16L 55/13; F16L 55/128; F16L 55/1108; F16L 55/12; F16L 55/136
USPC ............................. 138/89, 90; 220/237, 234
See application file for complete search history.

(56) References Cited

U.S. PATENT DOCUMENTS

| 509,678 | A | | 11/1893 | Pollard | |
|---|---|---|---|---|---|
| 2,514,911 | A | | 7/1950 | Tatum | |
| 2,870,794 | A | | 6/1954 | Thaxton | |
| 3,542,076 | A | * | 11/1970 | Richardson | ........... G01M 3/022 138/89 |
| 4,091,841 | A | * | 5/1978 | Beneker | ................... F16L 55/13 138/89 |
| 4,114,654 | A | | 9/1978 | Richardson | |
| 4,154,465 | A | * | 5/1979 | Van Meter | ............ F16L 55/136 285/312 |

(Continued)

FOREIGN PATENT DOCUMENTS

FR 337734 4/1904

OTHER PUBLICATIONS

International Search Report and Written Opinion for related PCT application PCT/US2019/045904 dated Oct. 24, 2019. (SA5868).

*Primary Examiner* — Patrick F Brinson
(74) *Attorney, Agent, or Firm* — Bracewell LLP; Constance R. Rhebergen

(57) ABSTRACT

A plug assembly is used to block flow through a heat exchanger tube. The plug assembly includes a frusto-conical plug body, a frangible attachment on an end of the plug body, and a ring assembly circumscribing the plug body. When positioned around a larger diameter portion of the plug body, the ring assembly is urged radially outward to seal against and block flow through the tube. An installation device draws the plug body within the ring assembly to set the plug assembly in the tube. The installation device is manually operated, and positions the ring assembly over the larger diameter portion of the plug body by exerting an axial force onto the frangible attachment while simultaneously holding the ring assembly in place. The ring assembly is held in place with a second axial force directed opposite to that of the one applied to the frangible attachment.

20 Claims, 6 Drawing Sheets

(56) References Cited

U.S. PATENT DOCUMENTS

| | | | |
|---|---|---|---|
| 4,282,982 A | 8/1981 | Nuesslein | |
| 4,381,800 A | 5/1983 | Leslie | |
| 4,598,738 A * | 7/1986 | Weber | F28F 11/02 |
| | | | 138/89 |
| 4,670,975 A | 6/1987 | Dettinger | |
| 4,723,578 A | 2/1988 | Mordarski et al. | |
| 4,771,810 A * | 9/1988 | Ermold | F16L 55/136 |
| | | | 138/89 |
| 4,903,392 A * | 2/1990 | Stickel | B23P 19/025 |
| | | | 29/426.1 |
| 4,967,468 A * | 11/1990 | Vossbrinck | B23P 19/025 |
| | | | 138/89 |
| 5,291,651 A | 3/1994 | Frame | |
| 5,437,310 A * | 8/1995 | Cunningham | F16L 55/1141 |
| | | | 138/89 |
| 5,797,431 A | 8/1998 | Adams | |
| 7,314,065 B1 * | 1/2008 | Adelman | F16L 55/11 |
| | | | 138/89 |
| 9,518,790 B2 | 12/2016 | Jorgensen | |
| 9,541,337 B2 * | 1/2017 | Al-Otaibi | F16L 55/132 |
| 2004/0074549 A1 * | 4/2004 | Allen | F16L 55/132 |
| | | | 138/89 |
| 2011/0240278 A1 | 10/2011 | Al-Otaibi | |

\* cited by examiner

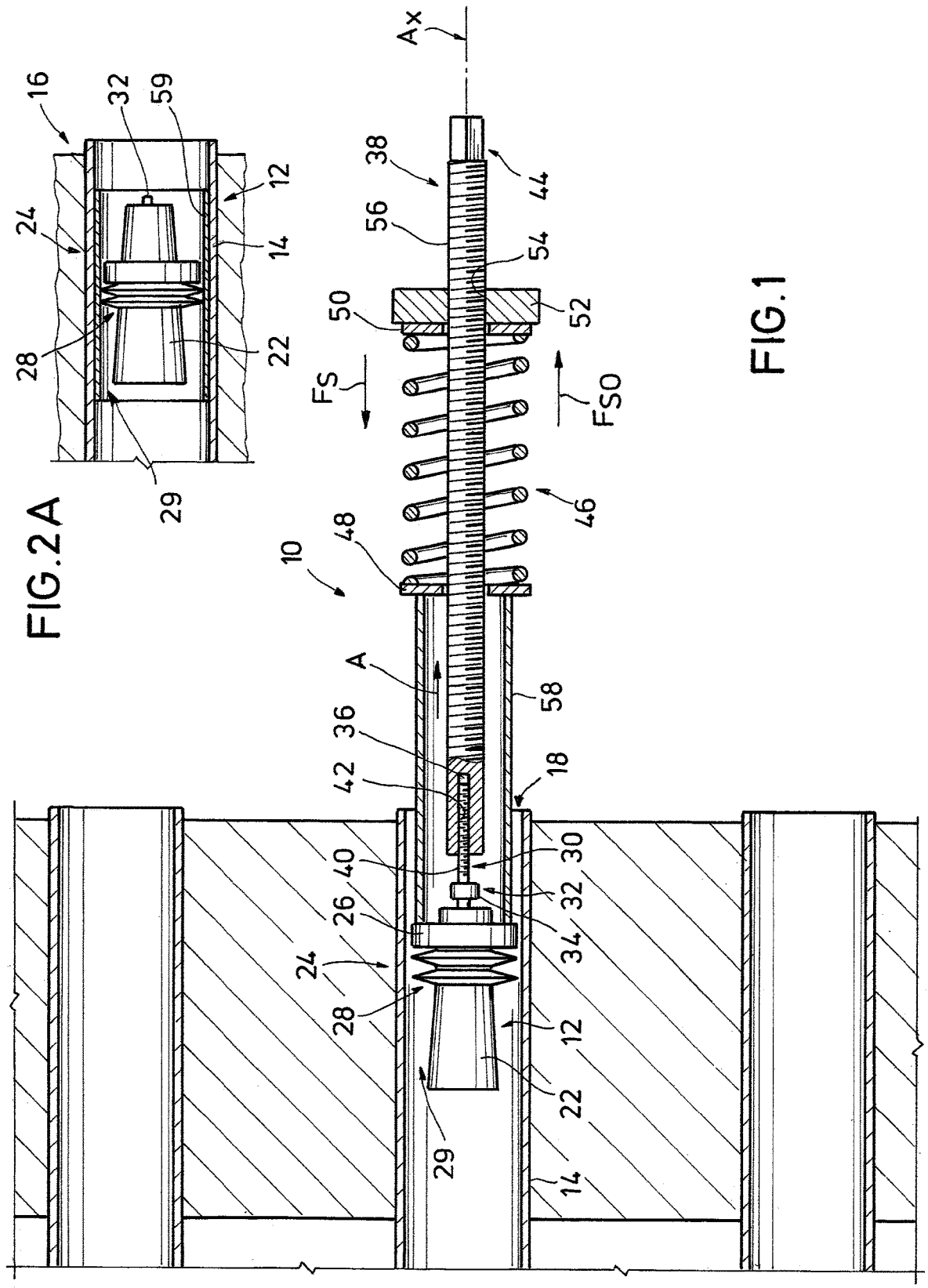

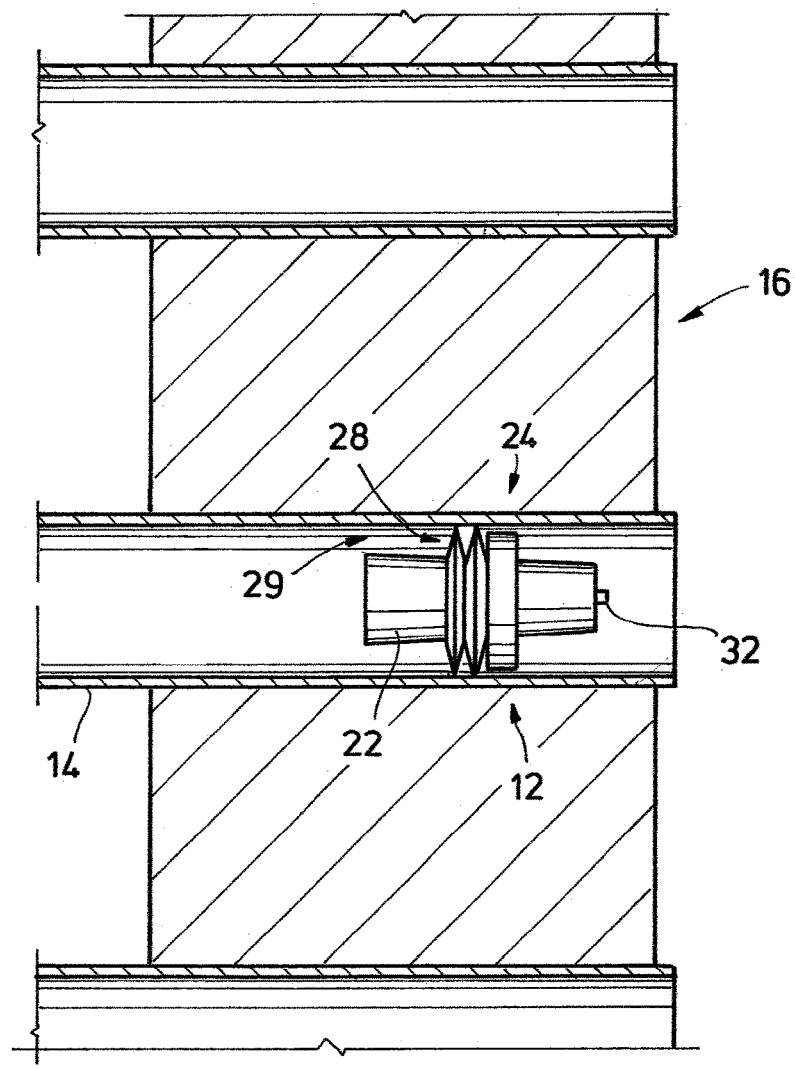
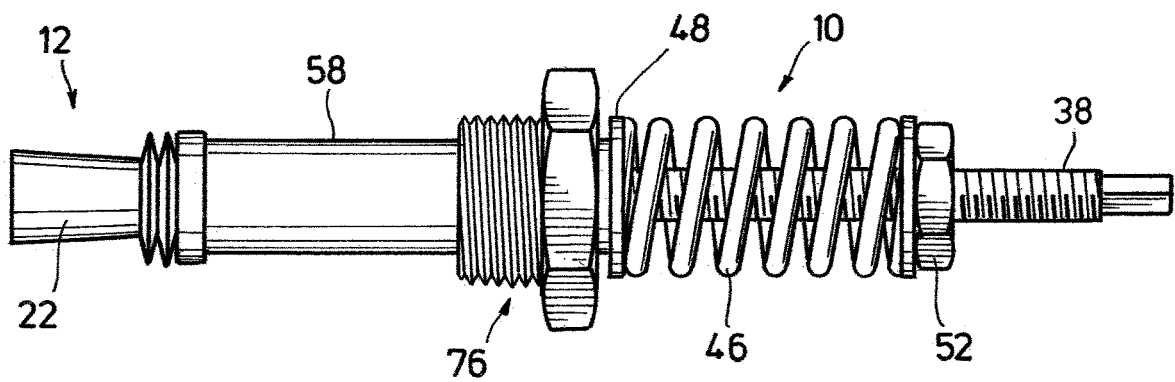

PLUGGING A HEAT EXCHANGER TUBE

BACKGROUND

1. Field

The present disclosure relates to blocking fluid flow through a tube. More specifically, the present disclosure relates to plugging a tube in a heat exchanger.

2. Related Art

Heat exchangers are often used for transferring thermal energy between fluids; and typically have tubes that are routed inside of a housing. Usually one of the fluids flows inside of the tubes ("tube side fluid"), while at the same time the other fluid flows across outer surfaces of the tubes ("shell side fluid"). Ends of the tubes are generally supported inside the housing by tube sheets; the tube sheets also form a barrier inside the housing that isolates the tube side fluid from the shell side fluid. Generally, open ends of the tubes terminate adjacent a side of the tube sheet, and which are accessible by removing an end of the housing. The tubes may experience a leak along their body or where they join with the tube sheet, and which allows communication between the tube and shell side fluids.

One approach to address the leak and stop communication between the shell and tube sides is to insert a plug from a plug assembly at one or both ends of the leaking tube. Most of these plugs have either a cylindrical or frusto-conical shaped plug body, and which may or may not include a separate sealing means. An elastomeric seal is included with some plug assemblies that circumscribes a portion of the plug body; where the seal is radially expanded against the inside of the tube. Some plug assemblies only have a frusto-conically shaped plug body, without additional hardware, and are simply forced into open ends of the leaking tube to plug the tube. Other types of plug assemblies have frusto-conically shaped plug bodies that insert within a sealing ring. The plug body is urged through the sealing ring to position the larger diameter portion of the plug body within the sealing ring, and which radially expands the sealing ring to plug the tube. One drawback with many of the plug assemblies is that an electrically or hydraulically powered device is required for their installation, which sometimes require certified personnel or special permits.

SUMMARY

Disclosed is an example of a system for plugging a tube of a heat exchanger that includes an elongated bolt selectively coupled to a plug assembly, and where the plug assembly is made up of a frusto-conical plug body having a smaller diameter portion, rings circumscribing the plug body, and an elongated extension that extends from an end of the smaller diameter portion. A bore is formed in an end of the bolt that selectively receives and engages the extension, a helical spring circumscribes a portion of the bolt and that has an end coupled with the bolt, a strut member is selectively in compression between the spring and the rings, and a frame is included that has a portion coupled with the heat exchanger and a portion coupled with the bolt, and when adjusted in a certain position the bolt and plug assembly are in designated orientations. In an example, the frame includes a toroidal base collar, elongated cantilevered members mounted to an outer surface of the base collar, and legs that are attached and normal to the cantilevered members. Examples exist where the legs move along the cantilevered members into selective alignment with additional tubes of the heat exchanger. Other examples of the frame include mounting pads that land on terminal ends of the additional tubes and that are adjustably coupled along lengths of the legs so that an orientation of the collar is adjusted by adjusting where a mounting pad is coupled on a leg while the mounting pad is landed on a terminal end of one of the additional tubes. Additional embodiments of the system include nut that engages the bolt at a location along a length of the bolt, and that is in abutting contact with an end of the spring distal from the strut to comprise a means for coupling the spring to the bolt. Threads are optionally included on an outer surface of the extension that engage threads on an inner surface of the bore, where rotating the bolt in a designated direction draws the extension into the bore and draws a larger diameter portion of the plug body within the rings to urge the rings radially outward into sealing contact with an inner surface of the tube. In an alternate example further rotating the bolt exerts a compressive force onto the spring, that is transmitted to the rings in a direction opposite from that which the plug body is being urged. In one embodiment the strut is an annular sleeve that circumscribes a portion of the bolt and the extension.

Also disclosed herein is a method of plugging a tube of a heat exchanger, and which includes disposing a plug assembly in the tube and that is made up of an elongated plug body, an annular ring assembly circumscribing the plug body, and a frangible extension projecting from an end of the plug body. A first axial force is applied to the extension, and a second axial force is applied to the ring assembly that is oppositely directed to the first axial force. A barrier is formed in an annular space between the plug body and an inner surface of the tube by continuing to apply the first and second axial forces and urging the ring assembly radially outward into contact with the tube so that an outer surface of the ring assembly is deformed to define a deformed ring assembly, and a seal between the deformed ring assembly and inner surface of the tube is improved by urging the deformed ring assembly axially within the tube. In an example the first axial force is applied manually. Embodiments exist where the first axial force is applied by rotating a bolt having a bore that engages the extension so that the extension is drawn into the bore, and wherein the second axial force is applied from a strut that is coupled with the bolt. Optionally, a force for urging the deformed ring assembly axially within the tube is from a resilient member that is compressed during the step of applying the first axial force. The method alternatively includes coupling the plug assembly with structure of the heat exchanger that is outside of the tube. An optional step to the method includes orienting the plug body by adjusting the structure. In an alternative, the step of orienting the plug body involves aligning an axis of the plug body with an axis of the tube.

Another example system for plugging a tube of a heat exchanger is described and which includes an elongated bolt that is in selective engagement with a plug assembly having a plug body, a ring assembly that circumscribes the plug body, and an extension that projects from a portion of the plug body having smaller diameter. The system of this example also includes a bore in an end of the bolt that selectively couples with the extension and is profiled so that the extension is pulled into the bore by manually rotating the bolt in a designated direction, a strut having an end in abutting contact with the ring assembly and that extends axially along a portion of the bolt, and a resilient member having an aft end coupled with the bolt and a forward end in contact with an end of the strut distal from the ring assembly, and that is compressed as the bolt is rotated in the designated direction. An optional frangible connection attaches the extension to the plug body, and wherein when frangible connection fails, the resilient member expands and exerts an axial force against the ring assembly that urges the ring assembly away from the resilient member. In one embodiment, a nut is mounted on the bolt and which is the coupling between the aft end of the resilient member and the bolt. Examples exist where the resilient member is a helical spring. A frame for orienting the plug assembly inside of the tube is optionally included.

BRIEF DESCRIPTION OF DRAWINGS

Some of the features and benefits of that in the present disclosure having been stated, and others will become apparent as the description proceeds when taken in conjunction with the accompanying drawings, in which:

FIG. 1 is a side sectional view of an example of installing a plug in a heat exchanger tube with an embodiment of an installation device.

FIG. 2 is a side sectional view of the plug installed in the heat exchanger tube of FIG. 1.

FIG. 5 is a perspective view of an alternate embodiment of the installation device of FIG. 1.

DETAILED DESCRIPTION

Figure 3:
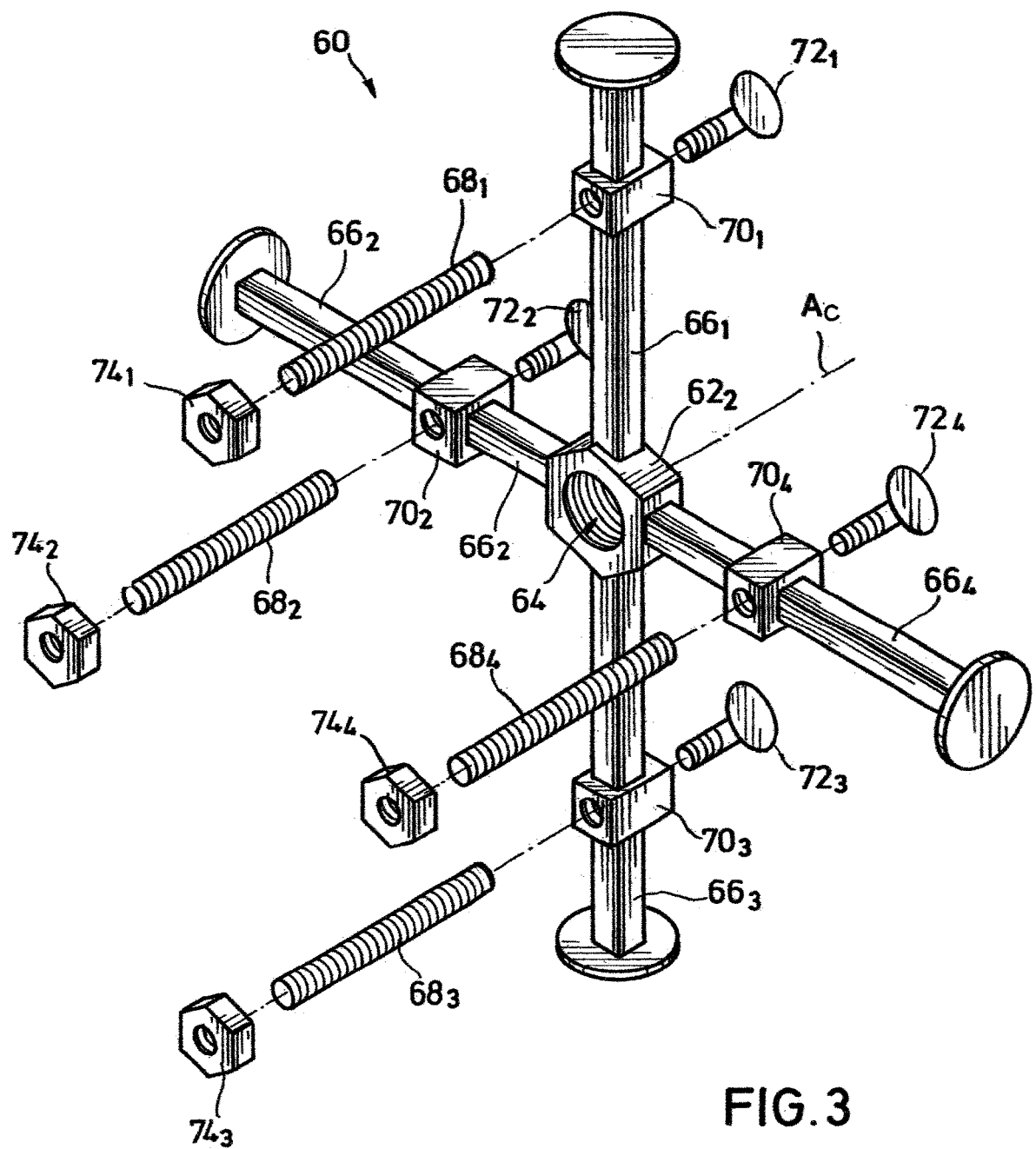
FIG. 3 is a perspective view of an embodiment of a support frame for use with the installation device of FIG. 1.

The method and system of the present disclosure will now be described more fully after with reference to the accompanying drawings in which embodiments are shown. The method and system of the present disclosure may be in many different forms and should not be construed as limited to the illustrated embodiments set forth; rather, these embodiments are provided so that this disclosure will be thorough, complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, materials, or embodiments shown and described. Modifications and equivalents will be apparent to one skilled in the art. Illustrative examples have been disclosed in the drawings and specification. Although specific terms are employed they are used in a generic and descriptive sense only and not for the purpose of limitation.

Shown in a side sectional view in FIG. 1 is an example of an installation device 10 for installing a plug assembly 12 into a tube 14 of a heat exchanger 16. An opening 18 is on an end of tube 14 that terminates adjacent a surface of a tube sheet 20 mounted in heat exchanger 16. Plug assembly 12 includes a frusto-conically shaped plug body 22, and a ring assembly 24 that circumscribes plug body 22. A platen 26 is included with ring assembly 24, which is an annular disk-like member that is adjacent rings 28 that also circumscribes a portion of the plug body 22. In the example of FIG. 1, an annulus 29 is disposed in the annular space between plug body 22 and inner surface of tube 14 and which extends along the outer periphery of rings 28. Additional components of plug assembly 12 are an elongated extension 30 and a base 32. Base 32 includes a pair of cylindrically shaped elements of different diameters, and with the smaller diameter segment mounted to a terminal end of plug body 22 having the smaller diameter. A frangible link 34 is formed on base 32 where its two different diameter elements are joined. Not to be bound by theory, but the reduced diameter element of base 32 likely fails before the larger diameter element due to a higher concentration of mechanical stresses. An end of extension 30 attaches to a lateral side of base 32 distal from plug body 22, and extends generally axially from plug body 22.

In the illustrated example of FIG. 1, an end of extension 30 distal from base 32 inserts into a bore 36 that is formed axially in a terminal end of an elongated bolt 38. Threads 40 are formed on an outer periphery of extension 30, and which engage threads 42 formed along an inner surface of the bore 36. Optional flats 44 are depicted profiled on an end of bolt 38 distal from bore 36, which provide surfaces for coupling a tool (not shown) to bolt 38 for applying a retaining force to bolt 38. A spring 46 is shown circumscribing a portion of a length of bolt 38, where spring 46 is a generally helical member and optionally disposed coaxial with an axis $A_X$ of bolt 38. A sleeve washer 48 is shown on bolt 38 and in contact with an end of spring 46 distal from flats 44. Also on bolt 38 is a nut washer 50 shown disposed on an axial end of spring 46 distal from sleeve washer 48. Washers 48, 50 are generally planar members, each having an axial bore sized to receive bolt 38 to provide for selective mounting of washers 48, 50 on bolt 38. Alternatives exist where washers 48, 50 are axially slideable along bolt 38, or coupled at selective axial locations on bolt 38, such as by threads or other known means.

Still referring to FIG. 1, nut 52 is included with the example of installation device 10 shown disposed on bolt 38 adjacent nut washer 50. In this example, nut 52 is coupled to bolt 38 by threads 54 on an inner circumference of nut 52 that engage threads 56 formed on outer surface of bolt 38. An elongated and annular sleeve 58 is further included with the installation device 10, which is shown circumscribing terminal end of plug body 22, base 32, bolt 40, and a portion of bolt 38 distal from flats 44. Opposing ends of sleeve 58 abut sleeve washer 48 and a lateral surface of platen 26 opposite from rings 28. In an example of operation, and after installation device 10 is assembled as illustrated in FIG. 1, nut 52 is rotated with respect to and about bolt 38; which induces the nut 52 to move axially along bolt 38 due to engagement between threads 54, 56. In this example, bolt 38 is held rotationally stationary by applying a retaining force to flats 44, such as with a wrench or spanner (not shown). Rotating nut 52 in a designated direction causes nut 52 to translate towards washer 48, which exerts an axial force $F_S$ onto spring 46 that transfers to rings 28, via platen 26, sleeve 58, and washer 48. A force $F_{SO}$ opposite to axial force $F_S$ is exerted against washer 50, and which transfers to plug body 22, via nut 52, bolt 38, extension 42, link 34, and their respective connections. When the magnitude of force $F_{SO}$ exceeds forces opposing axial movement of the rings 28 along the plug body 22, the plug body 22 is moved axially with respect to rings 28 towards sleeve 58. Force $F_S$ exerted onto sleeve 58, platen 26, and rings 28, retains rings 28 in place as plug body 22 is drawn within rings 28. Urging plug body 22 axially in the direction of arrow A repositions plug body 22 axially within the rings 28 so that the larger diameter portion of plug body 22 is within and circumscribed by rings 28. In an alternative, washers 48, 50 are not included with the installation device 10, and spring 46 is compressed directly between nut 52 and sleeve 58. The sleeve 58 through its contact with platen 26 interferes with axial movement of ring assembly 24 in the tube 14, and retains rings 28 in place as plug body 22 is drawn through rings 28. In an embodiment, sleeve 58 operates as strut member when in compression between platen 26 and sleeve washer 48. After axially moving plug body 22, the portion of the plug body 22 within the rings 28 has an outer diameter greater than an inner diameter of the rings 28. Positioning the larger diameter portion of the plug body 22 inside the rings 28 radially enlarges the rings 28 and urges the outer periphery of the rings 28 into sealing engagement with an inner surface of the tube 14. Compressing the spring 46 stores potential energy within the spring 46, which is exerted in opposite directions against washers 48, 50.

Referring now to FIG. 2, shown is an example of tube 14 being blocked with an installed plug assembly 12. As shown, rings 28 are disposed on a larger diameter portion of plug body 22 (with respect to its initial position as shown in FIG. 1). A diameter of this larger diameter portion of plug body 22 exceeds an inner diameter of rings 28, causing them to expand radially outward into contact with the inner surface of the tube 14. In the example of FIG. 2, rings 28 occupy an annulus 29 formed between the inner surface of tube 14 and outer periphery of plug body 22, and thereby fill a portion of a cross section of tube 14 not already taken up by plug body 22. Depicted in the example of FIG. 2 is that the outer peripheries of rings 28 are deformed by contact with the inner surface of tube 14, which increases the sealing contact between rings 28 and tube 14. In the example of FIG. 2, the applied force from the installation device 10 onto extension 30 (FIG. 1) overcomes a yield strength of the frangible link 34 so that the extension 30 and a portion of base 32 are removed from the plug body 22. An advantage of spring 46 is that a compressive force allows rings 28 to slide against the inner surface of tube 14 after rings 28 are in contact with and deformed by tube 14. In an example, a spring constant of the spring 46 is at a designated value so that the spring 46 is uncompressed as plug body 22 is pulled through rings 28, until the outer peripheries of the rings 28 are in contact with the tube 14. Shown in side section view in FIG. 2A is an optional protective sleeve 59 disposed in tube 14 and circumscribing rings 28. The protective sleeve 59 provides a buffer between rings 28 and inner surface of tube 14 to prevent against deforming or other damage of tube 14 when contacted by rings 28. Embodiments exist where material of sleeve 59 is selected to be compatible with plug assembly 12 so galvanic corrosion does not occur. In one example of installation, sleeve 59 is hydraulically expanded in place inside tube 14.

Referring now to FIG. 3, shown in a perspective view is an example of a support frame 60 that is optionally used in conjunction with the installation device 10. Support frame 60 includes an toroidal base collar 62 with a bore 64 extending axially within. Cantilevered members $66_{1-4}$ are shown mounted on a radial surface of the base collar 62 that are spaced angularly apart from one another, and which project radially outward from an axis $A_C$ of base collar 62. In the example of FIG. 3, members $66_{1-4}$ are disposed at approximately 90° apart from one another, but alternatives exist where the spacing is less than or greater than 90°.

Extending generally perpendicular from each of the cantilevered members $66_{1-4}$ are legs $68_{1-4}$ and which are mounted to the member $66_{1-4}$ by yokes $70_{1-4}$. As shown, legs $68_{1-4}$ are elongated members oriented generally parallel with axis $A_C$ that each extend in the same direction from yokes $70_{1-4}$. Examples exist where legs $68_{1-4}$ are fixedly attached within yokes $70_{1-4}$, or are coupled such that legs $68_{1-4}$ are adjustable extended from yokes $70_{1-4}$. Each of the yokes $70_{1-4}$ circumscribe the cantilevered members $66_{1-4}$ and are slideable along the members in a direction radial with axis $A_C$. Fasteners $72_{1-4}$ are illustrated in this example that intersect sidewalls of the yokes $70_{1-4}$ and provide a securing means for each of the legs $68_{1-4}$ at a designated length along a corresponding one of the members $66_{1-4}$. Optional stops are shown on the terminal ends of each of the cantilevered members $66_{1-4}$ and on ends distal from where the members $66_{1-4}$ mount to the collar 62. Further, mounting pads $74_{1-4}$ are selectively positioned along lengths of the legs $68_{1-4}$ that provide for selective positioning and orientation of the frame 60 on a surface of a heat exchanger. In a non-limiting example of use, positioning the mounting pads 7414 at a particular axial location along one of corresponding legs $68_{1-4}$ dictates a distance between each one of the mounting pads $74_{1-4}$ and an associated one of the members $66_{1-4}$. In a further example, an orientation of axis $A_C$ is selectively adjusted by strategic positioning of the mounting pads $74_{1-4}$ at particular axial locations along corresponding legs $68_{1-4}$. Yet further alternatively, orientation of axis $A_C$ is aligned by adjusting placement of legs $68_{1-4}$ within the yokes $70_{1-4}$.

Figure 4:
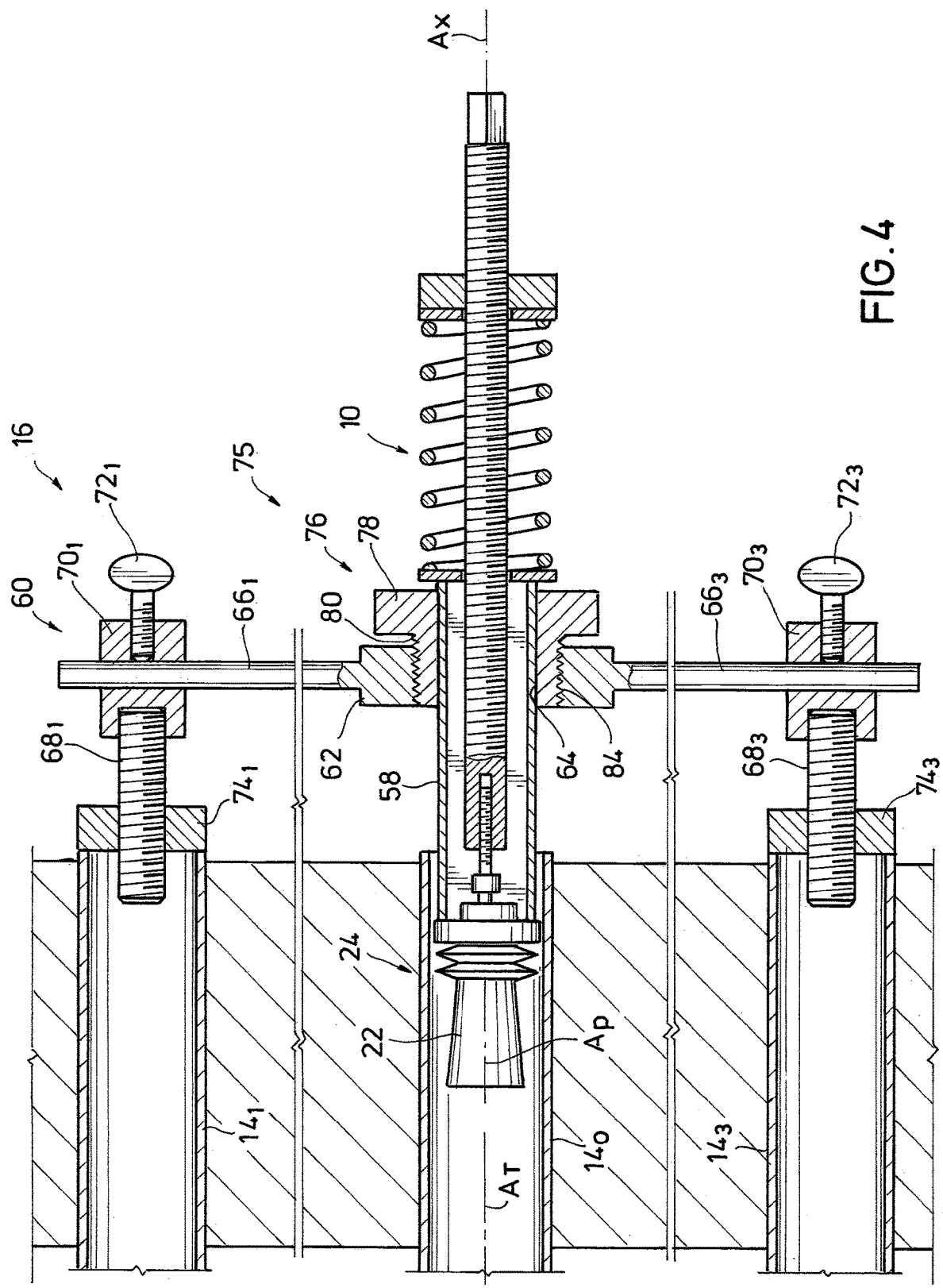
FIG. 4 is a side sectional view of an example of installing a plug in a heat exchanger tube with an embodiment of an installation device of FIG. 1 and an embodiment of the support frame of FIG. 3.

In FIG. 4 an example of operation of the installation device 10 in conjunction with frame 60 is shown in a side sectional view. For the purposes of discussion herein the combination of the installation device 10 and frame 60 forms an installation assembly 75. Here, the sleeve 58 extends axially through bore 64 of base collar 62, and a bushing 76 is provided between sleeve 58 and the collar 62. Bushing 76 includes a flange portion 78 which is shown extending radially outward from axis $A_X$, and a barrel portion 80 that projects axially from flange 78, and into the annular space between collar 62 and sleeve 58. In the illustrated example of the installation device 10, sleeve 58 is slideable with respect to bushing 76. In an embodiment, sleeve 58 and bushing 76 are rotationally coupled to one another by flats (not shown) complementarily formed on their respective contacting surfaces. Bushing 76 couples to the collar 62 by engagement of threads 84 provided respectively on the outer surface of barrel 80 and inner surface of collar 62. Further illustrated in FIG. 4 are yokes $70_{1,3}$ disposed at designated points along respective lengths of cantilever members $66_{1,3}$ so that legs $68_{1,3}$ align with and insert into open ends of tubes $14_{1,3}$. The orientation of base collar 62 affects positioning of plug body 22 within tube $14_0$, and the orientation of base collar 62 is set by where mounting pads $74_{1,3}$ are on legs $68_{1,3}$. In an example, plug body 22 is selectively aligned by adjusting mounting pads $74_{1,3}$ to strategic locations on legs $68_{1,3}$. In an example, a designated orientation is that when an axis $A_P$ of plug body 22 substantially coincides with an axis $A_T$ of tube $14_0$. In another embodiment, setting axis $A_X$ of bolt 38 to coincide with axis $A_T$ of tube $14_0$ substantially orients the plug assembly 24 in a designated orientation. In an alternative, fasteners $72_{1,3}$ are used for securing the yokes $70_{1,3}$ at positions along the cantilevered members $66_{1,3}$, which align the legs $68_{1,3}$ for entry into tubes $14_{1,3}$.

In a non-limiting example of use, installation assembly 10 is assembled outside of tube $14_0$, and after the bushing 76 is engaged with the collar 62, the sleeve 58 is inserted into the bushing 76. The ring 28 is placed on the pin 22, and the bolt 38 is inserted through the sleeve 58 to attach with the extension 30. The frame 60 with installation assembly 10 is placed on the tube sheet 20, and the frame 60 is balanced to put the plug assembly 12 into a designated orientation and position within the tube $14_0$. The sleeve washer 48, spring 46, nut washer 50, and nut 52 are then added to bolt 38. In an alternative for installing the plug assembly 12, the nut 52 is rotated about the bolt 38 in a designated direction that translates nut 52 along bolt 38 in a direction towards plug body 22 to produce a compressional force within spring 46, which is exerted onto sleeve 58 in a direction illustrated by arrow $F_S$ (FIG. 1). Further, the respective movement of nut 52 and bolt 38, draws extension 30 and plug body 22 in a direction opposite to that of arrow $F_S$. Sleeve 58 blocks movement of the rings 28 as the plug body 22 is drawn within rings 28. Further in this example, by virtue of rotationally coupling sleeve 58 and bushing 76, the sleeve 58 does not rotate while nut 52 rotates about bolt 38.

An example of the installation device 10 is shown in a perspective view in FIG. 5. Bushing 76 is included in this example, which is shown circumscribing a portion of the sleeve 58 proximate to where sleeve 58 abuts sleeve washer 48. Illustrated in the example of FIG. 5, embodiments exist where plug assembly 12 is coupled with installation tool 10 before plug assembly 12 is inserted into tube 14 (FIG. 1). Also provided in FIG. 5 is that an embodiment exists where bushing 76 is added to installation tool 10 prior to being combined with frame 60 (FIG. 4).

Figure 6:
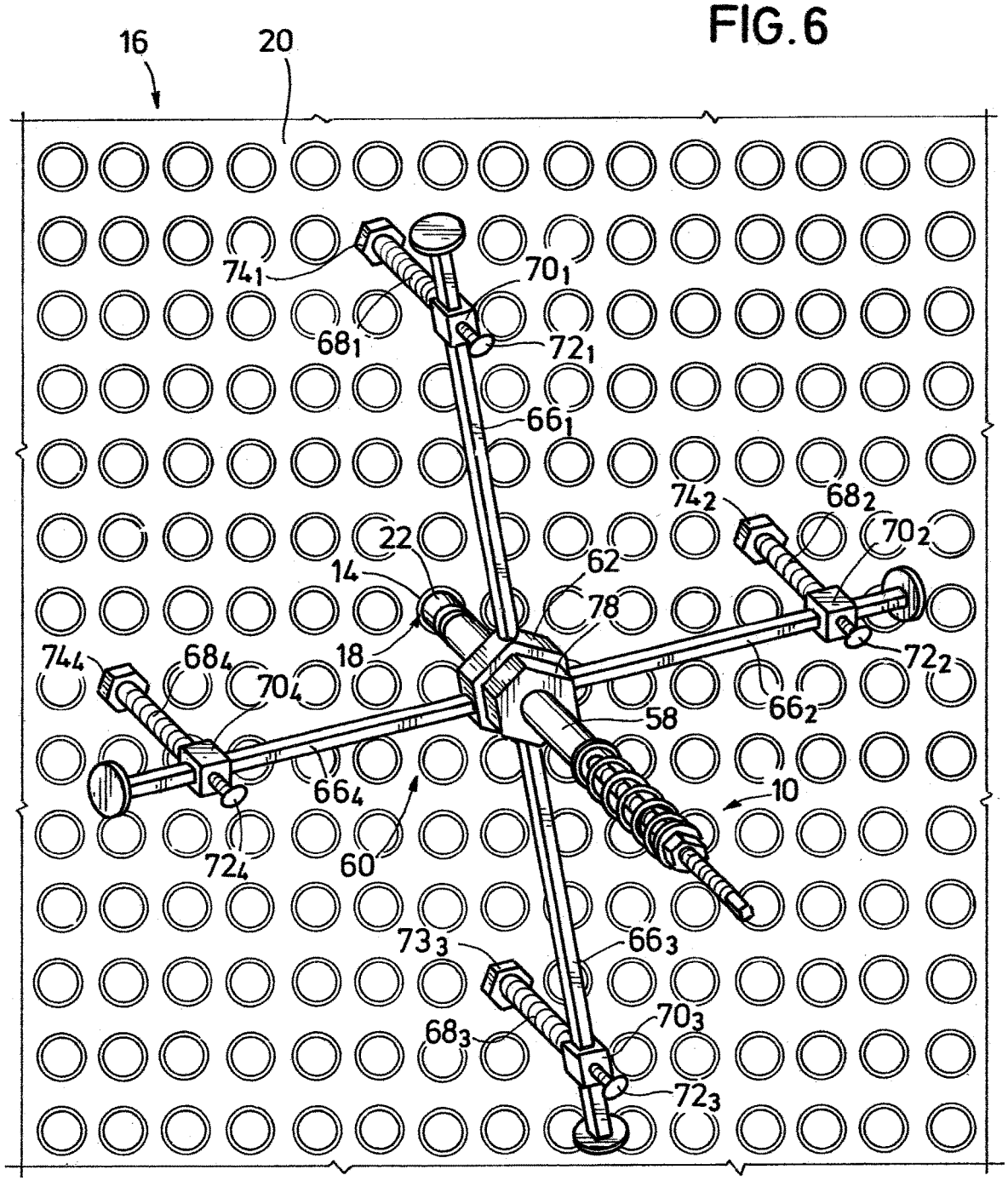
FIG. 6 is a perspective view of an embodiment of the installation device of FIG. 1 and frame of FIG. 3 being mounted to a heat exchanger.

Shown in a perspective view in FIG. 6 is an example of the installation device 10 being positioned over a tube sheet 20 of a heat exchanger 16. Here, the plug body 22 is shown outside of tube 14 and proximate its opening 18, and legs $68_{1-4}$ of frame 60 are illustrated inserted within other tubes of heat exchanger 16 that are spaced radially away from tube 14. As indicated previously, placing mounting pads $74_{1-4}$ strategically along the legs $68_{1-4}$ positions installation device 10 such that when plug body 22 is inserted within tube 14, plug body 22 and associated rings 28 (FIG. 4) are in a designated orientation. An example of a designated orientation is where rings 28 are coaxial with tube 14 and when compressively set within tube 14, deformation of rings 28 is substantially uniform along their circumferences to form a sealing surface between plug assembly 12 and inner surface of tube 14.

Figure 7:
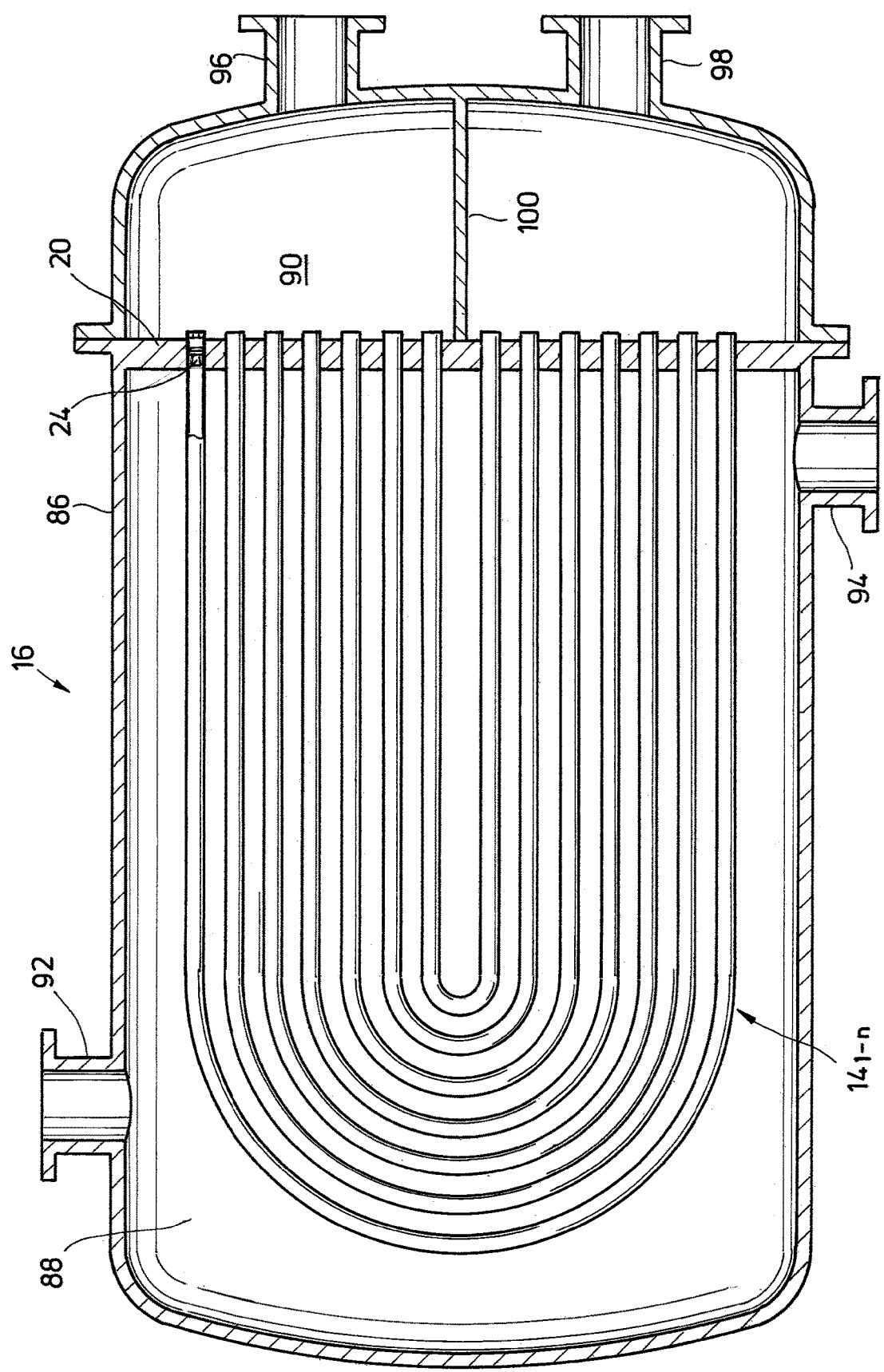
FIG. 7 is a side sectional view of an example of a heat exchanger with a plug installed in a heat exchanger tube.

Shown in a side sectional view in FIG. 7 is one example of heat exchanger which includes a housing 86, and a shell side 88 and tube side 90 within the housing 86. Here, tube sheet 20 forms a barrier inside housing 86 that defines a boundary between shell side 88 and tube side 90. Nozzles 92, 94 intersect the housing 86 and provide a flow of fluid across a sidewall of housing 86 to and from shell side 88. Similarly, nozzles 96, 98 also intersect housing 86 to provide fluid communication between tube side 90 and outside of heat exchanger 16. A plenum wall 100 projects laterally from the tube sheet 20 and intersects a sidewall of housing 86. Plenum wall 100 directs fluid into tubes $14_{1-n}$ that enters plenum 90 from either one of the nozzles 96, 98, and blocks fluid flow directly between nozzles 96, 98 in plenum 90. Additionally illustrated in the example of FIG. 7 is a plug assembly 24 that has been installed in one of tubes $14_{1-n}$ and for blocking flow through that tube. Plug assembly 24 is shown inward of tube sheet 20; alternatively plug assembly 24 is aligned with tube sheet 20.

The present disclosure therefore is well adapted to carry out the objects and attain the ends and advantages mentioned, as well as others inherent. While embodiments of the disclosure have been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. A system for plugging a tube of a heat exchanger comprising:
    an elongated bolt selectively coupled to a plug assembly that comprises a frusto-conical plug body having a smaller diameter portion, rings circumscribing the plug body, and an elongated extension that extends from an end of the smaller diameter portion;
    a bore formed in an end of the bolt that selectively receives and engages the extension;
    a helical spring circumscribing a portion of the bolt, and having an end coupled with the bolt;
    a strut member that is selectively in compression between the spring and the rings; and
    a frame having a portion coupled with the heat exchanger and a portion coupled with the bolt, and when adjusted in a certain position the bolt and plug assembly are in designated orientations.

2. The system of claim 1, where the frame comprises a toroidal base collar, elongated cantilevered members mounted to an outer surface of the base collar, and legs that are attached and normal to the cantilevered members.

3. The system of claim 2, wherein the tube comprises a first tube and the heat exchanger comprises additional tubes, and wherein the legs are moveable along the cantilevered members into selective alignment with selected ones of the additional tubes.

4. The system of claim 3, further comprising mounting pads that land on terminal ends of the additional tubes and that are adjustably coupled along lengths of the legs, wherein adjusting where a mounting pad is coupled on a leg while the mounting pad is landed on a terminal end of one of the additional tubes, an orientation of the collar is adjusted.

5. The system of claim 1, further comprising a nut that engages the bolt at a location along a length of the bolt, and that is in abutting contact with an end of the spring distal from the strut to comprise a means for coupling the spring to the bolt.

6. The system of claim 5, further comprising threads on an outer surface of the extension that engage threads on an inner surface of the bore, wherein rotating the bolt in a designated direction draws the extension into the bore and draws a larger diameter portion of the plug body within the rings to urge the rings radially outward into sealing contact with an inner surface of the tube.

7. The system of claim 6, wherein further rotating the bolt exerts a compressive force onto the spring, that is transmitted to the rings in a direction opposite from that which the plug body is being urged.

8. The system of claim 1, wherein the strut comprises an annular sleeve that circumscribes a portion of the bolt and the extension.

9. A method of plugging a tube of a heat exchanger comprising:
    disposing a plug assembly in the tube and that comprises an elongated plug body, an annular ring assembly circumscribing the plug body, and a frangible extension projecting from an end of the plug body;

applying a first axial force to the extension and which compresses a resilient member to form a compressed resilient member;

applying a second axial force to the ring assembly that is from the compressed resilient member and is oppositely directed to the first axial force;

forming a barrier in an annular space between the plug body and an inner surface of the tube by continuing to apply the first and second axial forces and urging the ring assembly radially outward into contact with the tube so that an outer surface of the ring assembly is deformed to define a deformed ring assembly; and improving a seal between the deformed ring assembly and inner surface of the tube by urging the deformed ring assembly axially within the tube.

10. The method of claim 9, wherein the first axial force is applied manually.

11. The method of claim 9, wherein the first axial force is applied by rotating a bolt having a bore that engages the extension so that the extension is drawn into the bore, and wherein the second axial force is applied from a strut that is coupled with the bolt.

12. The method of claim 9, further comprising coupling the plug assembly with structure of the heat exchanger that is outside of the tube.

13. The method of claim 12, further comprising orienting the plug body by adjusting the structure.

14. The method of claim 13, wherein the step of orienting the plug body comprises aligning an axis of the plug body with an axis of the tube.

15. A system for plugging a tube of a heat exchanger comprising:

an elongated bolt that is in selective engagement with a plug assembly that comprises a plug body, a ring assembly that circumscribes the plug body, and an extension that projects from a portion of the plug body having smaller diameter;

a bore in an end of the bolt that selectively couples with the extension and is profiled so that the extension is pulled into the bore by rotating the bolt in a designated direction;

a strut having an end in abutting contact with the ring assembly and that extends axially along a portion of the bolt; and a resilient member having an aft end coupled with the bolt and a forward end in contact with an end of the strut distal from the ring assembly, and that is compressed as the bolt is rotated in the designated direction.

16. The system of claim 15, wherein a frangible connection attaches the extension to the plug body, and wherein when frangible connection fails, the resilient member expands and exerts an axial force against the ring assembly that urges the ring assembly away from the resilient member.

17. The system of claim 15, wherein a nut on the bolt comprises the coupling between the aft end of the resilient member and the bolt.

18. The system of claim 15, wherein the resilient member comprises a helical spring.

19. The system of claim 15, further comprising a frame for orienting the plug assembly inside of the tube.

20. The system of claim 15, further comprising a protective sleeve disposed between the ring assembly and an inner surface of the tube.

* * * * *